(12) United States Patent
Yanase et al.

(10) Patent No.: US 9,387,736 B2
(45) Date of Patent: Jul. 12, 2016

(54) SYSTEM, METHOD, AND PROGRAM FOR DETECTING DEFLATED TIRES

(75) Inventors: Minao Yanase, Kobe (JP); Seigou Sakagami, Ashiya (JP); Yuji Oshiro, Kobe (JP); Tomonori Sakai, Tochigi-ken (JP); Shinya Notomi, Sakura (JP); Kazutaka Saito, Utsunomiya (JP); Kazunari Okada, Tochigi-ken (JP); Ichiro Ueno, Tochigi-ken (JP)

(73) Assignees: SUMITOMO RUBBER INDUSTRIES, LTD., Kobe-Shi (JP); HONDA MOTOR CO., LTD., Tokyo (JP)

( * ) Notice: Subject to any disclaimer, the term of this patent is extended or adjusted under 35 U.S.C. 154(b) by 950 days.

(21) Appl. No.: 13/486,388

(22) Filed: Jun. 1, 2012

(65) Prior Publication Data

US 2012/0310590 A1 Dec. 6, 2012

(30) Foreign Application Priority Data

Jun. 3, 2011 (JP) .................. 2011-125077

(51) Int. Cl.
*B60C 23/06* (2006.01)
(52) U.S. Cl.
CPC .................. *B60C 23/061* (2013.01)
(58) Field of Classification Search
CPC .................. B60C 23/061
See application file for complete search history.

(56) References Cited

U.S. PATENT DOCUMENTS 4,876,528 A 10/1989 Walker et al.
5,710,539 A * 1/1998 Iida ................ 340/444
2004/0002795 A1 * 1/2004 Tanimoto ........... B60T 8/172
   701/1
2007/0203627 A1 * 8/2007 Bolzmann et al. ...... 701/41
2008/0252486 A1 * 10/2008 Luke ............. B60W 10/20
   340/932.2
2011/0066321 A1 * 3/2011 Bechtler .......... B60T 8/17551
   701/29.2
2012/0197507 A1 * 8/2012 Custer et al. .......... 701/96

FOREIGN PATENT DOCUMENTS

| DE | 199 61 681 A1 | 10/2000 |
|---|---|---|
| JP | 62-61814 A | 3/1987 |
| JP | 63-305011 A | 12/1988 |
| JP | 6-183227 A | 7/1994 |
| JP | 10-166821 A | 6/1998 |
| JP | 2003-312520 A | 11/2003 |
| JP | 2005-7933 A | 1/2005 |

(Continued)

*Primary Examiner* — Regis Betsch
(74) *Attorney, Agent, or Firm* — Birch, Stewart, Kolasch & Birch, LLP

(57) ABSTRACT

A system for detecting deflated tires by making a relative comparison among rotation speeds of tires attached to a vehicle. The system includes a rotation speed information detection means for detecting rotation speed information of the tires; a rotation speed calculation means for calculating rotation speeds of the tires; and a determination means for determining deflated tires by comparing a decreased pressure determination value using the calculated rotation speeds with a predetermined threshold value. The determination means determines that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby detecting deflated tires.

15 Claims, 5 Drawing Sheets

(56) References Cited

FOREIGN PATENT DOCUMENTS

| JP | 2006-131007 A | 5/2006 |
| JP | 2007-331622 A | 12/2007 |
| JP | 2008-247331 A | 10/2008 |
| JP | 2010-126093 A | 6/2010 |

* cited by examiner

SYSTEM, METHOD, AND PROGRAM FOR DETECTING DEFLATED TIRES

TECHNICAL FIELD

The present invention relates to a system, a method, and a program for detecting deflated tires. More particularly, the present invention relates to a system, a method, and a program for detecting deflated tires using the rotation speed information of tires attached to a running vehicle.

BACKGROUND ART

Conventionally, there has been a system for detecting a deflated tires based on the rotation speed (wheel speed) sensor information. This system uses a principle according to which deflated tires show a reduced outer diameter (tire dynamic loaded radius) compared to that of tires with a normal air pressure (reference pressure) and thus show an increased rotation speed and an increased rotation angle speed compared to those of other normal pressure tires. In case of a method of detecting deflated tires based on a relative difference in the rotational angular velocity of tires (see Patent Literature 1 for example) for example, a determination value DEL obtained by $$DEL=\{(F1+F4)/2-(F2+F3)/2\}/\{(F1+F2+F3+F4)/4\}\times 100(\%)$$

is used. In the formula, F1 to F4 represent rotational angular velocities of a left front tire, aright front tire, a left rear tire, and a right rear tire, respectively.

By the way, a tire dynamic loaded radius is influenced by factors other than a decreased pressure (e.g., tire load shift during cornering). Thus, in order to correctly determine deflated tires, a decreased pressure must be determined based on the tire rotation information that is obtained when the vehicle is not cornering (i.e., that is obtained during going straight). This also applies to system calibration when the tire air pressure is adjusted to a normal pressure or a tire is exchanged with a new one. Thus, calibration must be performed based on the tire rotation information during going straight.

Patent Literature 2 discloses, in order to improve the calibration accuracy as described above, a technique to monitor a vehicle lateral acceleration (lateral G) and a steering angle to perform calibration based only on the rotational angular velocity data that is obtained when the lateral acceleration and the steering angle are within a predetermined range.

CITATION LIST

Patent Literature

{PTL1} Japanese Unexamined Patent Publication No. 1988-305011
{PTL2} Japanese Unexamined Patent Publication No. 1994-183227

SUMMARY OF INVENTION

Technical Problem

However, the lateral G sensor for measuring the lateral G is influenced by a road surface cant. Thus, 0G cannot be measured even during going straight. Furthermore, a steering angle sensor for measuring a steering angle includes significant play and thus may not be able to measure 0° even during going straight, thus falsely determining going straight.

The present invention has been made in view of the situation as described above. It is an objective of the present invention to provide a system, a method, and a program for detecting deflated tires by which the vehicle under going straight can be determined with an improved accuracy.

Solution to Problem (1) In accordance with the present invention, there is provided a system for detecting deflated tires (hereinafter also may be simply referred to as "detection system") by making a relative comparison among rotation speeds of tires attached to a vehicle, including:

a rotation speed information detection means for detecting rotation speed information of the tires;

a rotation speed calculation means for calculating, based on the rotation speed information obtained from the rotation speed information detection means, rotation speeds of the tires; and a determination means for determining deflated tires comparing a decreased pressure determination value using the calculated rotation speeds with a predetermined threshold value, wherein the determination means determines that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby determining deflated tires.

According to the detection system of the present invention, it is determined that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value. The yaw rate value is not influenced by the road surface cant influencing on the lateral G sensor or the allowance included in the steering angle sensor. Thus, by use of the yaw rate value as information to determine the vehicle is going straight or not, the determination can be made with an improved accuracy. The yaw rate value or the like is evaluated based not on the absolute value but on the comparison of a difference between the maximum value and the minimum value at a predetermined time and a predetermined value. Thus, even when the value is offset, the going straight can be determined.

(2) The detection system of (1) may further include a calibration means for calculating a correction value to correct the rotation speeds of the respective tires with normal pressure, wherein the calibration may be configured to determine that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby performing calibration.

Calibration is also performed by determining that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value. Thus, the vehicle going straight can be determined with an improved accuracy.

(3) In the detection system of (1) or (2), the maximum value and the minimum value may be an average value at a predetermined unit time.

(4) In the detection system of (1) to (3), a predetermined value of the lateral G may be a value in the range of 0.03 to 0.09 (G), a predetermined value of the yaw rate may be a value in the range of 3 to 5 (deg/sec), and a predetermined value of the steering angle may be a value in the range of 5 to 9 (deg).

(5) In the detection system of (1) to (4), when the determination means determines that a difference between the maximum value and the minimum value at the predetermined time is equal to or higher than a predetermined value, the calculation of the tire rotation speed by the rotation speed calculation means may be stopped for a fixed period of time. In this way, a computer for the detection system installed in the vehicle can use the computational resource effectively.

(6) In the detection system of (2) to (5), when the calibration means determines that a difference between the maximum value and the minimum value at the predetermined time is equal to or higher than a predetermined value, the calculation of the tire rotation speed by the rotation speed calculation means can be suspended for a fixed period of time. In this way, a computer for the detection system installed in the vehicle can use the computational resource effectively.

(7) In accordance with the present invention, there is further provided a method of detecting deflated tires (hereinafter also may be simply referred to as "detection method") by making a relative comparison among rotation speeds of tires attached to a vehicle, including:

a rotation speed information detection step for detecting rotation speed information of the tires;

a rotation speed calculation step for calculating, based on the rotation speed information obtained in the rotation speed information detection step, rotation speeds of the tires; and a determination step for determining deflated tires by comparing a decreased pressure determination value using the calculated rotation speeds with a predetermined threshold value, wherein the determination step determines that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby determining deflated tires.

According to the detection method of the present invention, it is determined that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value. The yaw rate value is not influenced by the road surface cant influencing on the lateral G sensor or the play included in the steering angle sensor. Thus, by use of the yaw rate value as information to determine the vehicle is going straight or not, the determination can be made with an improved accuracy. The yaw rate value or the like is evaluated based not on the absolute value but on the comparison of a difference between the maximum value and the minimum value at a predetermined time and a predetermined value. Thus, even when the value is offset, the going straight can be determined.

(8) The detection method of (7) may further include a calibration step for calculating a correction value to correct the rotation speeds of the respective tires with normal pressure, wherein the calibration step may be configured to determine that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby performing calibration.

Calibration is also performed by determination that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value. Thus, the vehicle going straight can be determined with an improved accuracy.

(9) In the detection method of (7) or (8), the maximum value and the minimum value may be an average value at a predetermined unit time.

(10) In the detection method of (7) to (9), a predetermined value of the lateral G may be a value in the range of 0.03 to 0.09 (G), a predetermined value of the yaw rate may be a value in the range of 3 to 5 (deg/sec), and a predetermined value of the steering angle may be a value in the range of 5 to 9 (deg).

(11) In the detection method of (7) to (10), when the determination step determines that a difference between the maximum value and the minimum value at the predetermined time is equal to or higher than a predetermined value, the calculation of the tire rotation speed by the rotation speed calculation step may be suspended for a fixed period of time. In this way, a computer for the detection system installed in the vehicle can use the computational resource effectively.

(12) In the detection method of (8) to (11), when the calibration step determines that a difference between the maximum value and the minimum value at the predetermined time is equal to or higher than a predetermined value, the calculation of the tire rotation speed by the rotation speed calculation step can be suspended for a fixed period of time. In this way, a computer for the detection system installed in the vehicle can use the computational resource effectively.

(13) In accordance with the present invention, there is also provided a program for detecting deflated tires (hereinafter also may be simply referred to as "program") for causing, in order to detect deflated tires by making a relative comparison among rotation speeds of tires attached to a vehicle, a computer to function as:

a rotation speed calculation means for calculating rotation speeds of the tires based on rotation speed information obtained from a rotation speed information detection means for detecting rotation speed information of the tires; and a determination means for determining deflated tires comparing a decreased pressure determination value using the calculated rotation speeds with a predetermined threshold value, wherein the determination means determines that the vehicle is going straight when it is found, with regard to factors composed of a lateral G, a yaw rate, and a rudder angle of the vehicle, at least two of the factors including the yaw rate show that a difference between the maximum value and the minimum value at a predetermined time is lower than a predetermined value, thereby determining a tire having a decreased air pressure.

(14) In the program of (13), the computer may be further caused to function as a calibration for calculating a correction value to correct the rotation speeds of the respective tires when the tires with normal pressure, and wherein the calibration means may be configured to determine that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby performing calibration.

(15) In the program of (13) or (14), the maximum value and the minimum value may be an average value at a predetermined unit time.

(16) In the program of (13) to (15), a predetermined value of the lateral G may be a value in the range of 0.03 to 0.09 (G), a predetermined value of the yaw rate may be a value in the range of 3 to 5 (deg/sec), and a predetermined value of the rudder angle may be a value in the range of 5 to 9 (deg).

(17) In the program of (13) to (16), when the determination means determines that a difference between the maximum value and the minimum value at the predetermined time is equal to or higher than a predetermined value, the calculation of the tire rotation speed by the rotation speed calculation means may be suspended for a fixed period of time.

(18) In the program of (13) to (16), when the calibration means determines that a difference between the maximum value and the minimum value at the predetermined time is equal to or higher than a predetermined value, the calculation of the tire rotation speed by the rotation speed calculation means can be suspended for a fixed period of time.

Advantageous Effects of Invention

According to the detection system, the detection method, and the detection program of the present invention, the vehicle going straight can be determined with an improved accuracy.

DESCRIPTION OF EMBODIMENTS

Figure 1:
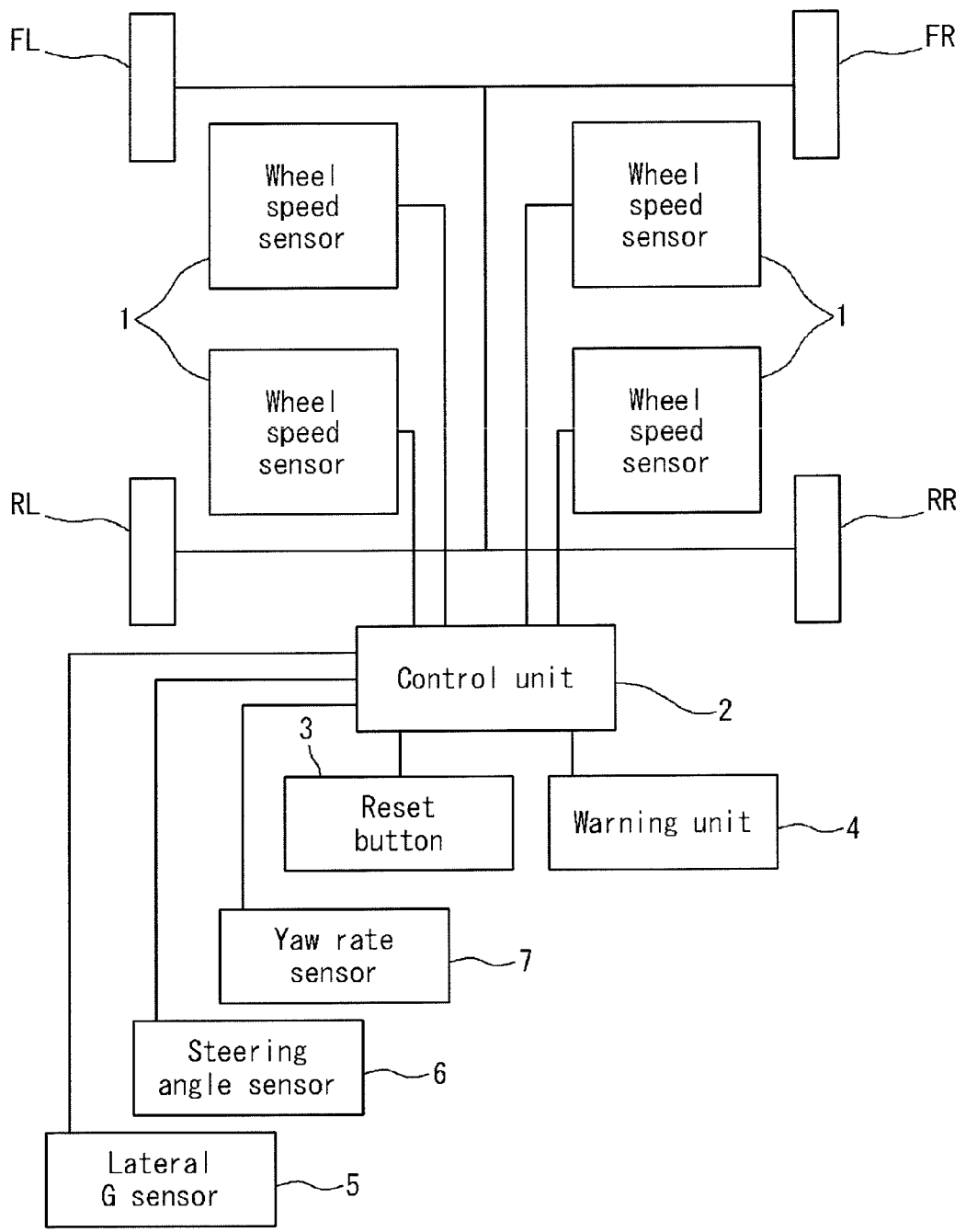
FIG. 1 is a block diagram illustrating one embodiment of a detection system of the present invention.
Figure 2:
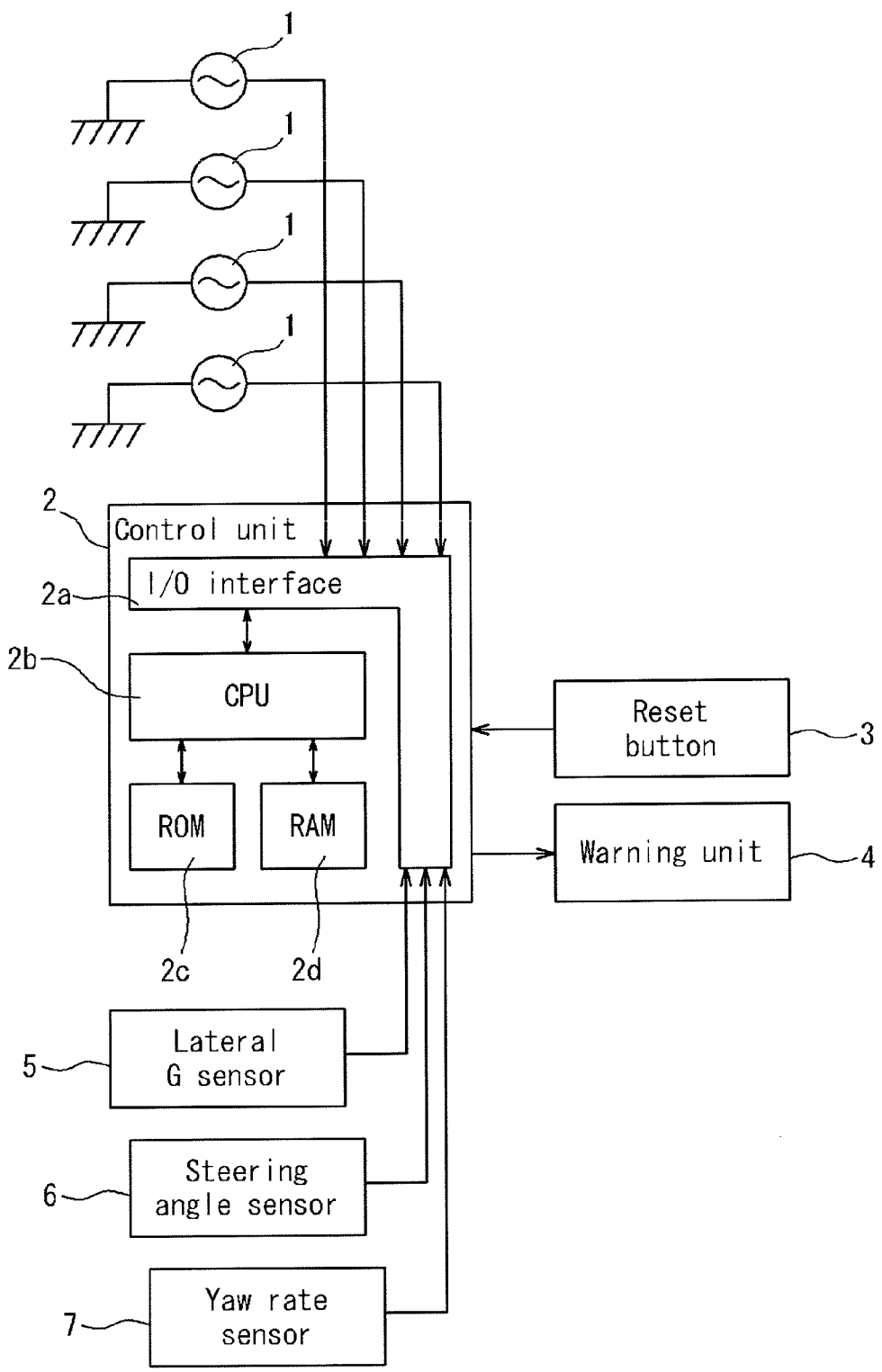
FIG. 2 is a block diagram illustrating an electric configuration of the detection system shown in FIG. 1.

Hereinafter, with reference to the attached drawings, an embodiment of a detection system, a method, and a program of the present invention will be described in detail. FIG. 1 is a block diagram illustrating one embodiment of a detection system of the present invention, and FIG. 2 is a block diagram illustrating an electric configuration of the detection system shown in FIG. 1.

As shown in FIG. 1, a detection system according to one embodiment of the present invention includes, in order to detect the rotation speeds of four tires provided in a four-wheel vehicle (a left front wheel (FL), a right front wheel (FR), a left rear wheel (RL), and a right rear wheel (RR)), a normal wheel speed detection means (rotation speed information detection means) 1 provided to be associated with the respective tires.

The wheel speed sensor 1 may be, for example, a wheel speed sensor that uses an electromagnetic pickup for example to generate a rotation pulse to measure a rotation angle speed and a wheel speed based on the number of pulses or an angular velocity sensor such as the one that generates power using rotation as in a dynamo to measure a rotation angle speed and a wheel speed based on this voltage. The output from the wheel speed sensor 1 is given to a control unit 2 that is a computer such as ABS. This control unit 2 is connected to a reset button 3 that can be operated by a driver and an alarm unit 4 for notifying the driver of deflated tires.

The vehicle is attached with a lateral G sensor 5 for measuring the lateral acceleration acting on the vehicle, a steering angle sensor 6 for measuring the steering angle to the direction along which the vehicle is running, and a yaw rate sensor 7 for measuring the change rate of the rotation angle in the cornering direction of the vehicle. These components are attached at appropriate positions. The outputs from the lateral G sensor 5, the steering angle sensor 6, and the yaw rate sensor 7 are also given to the control unit 2.

The lateral G sensor 5, the steering angle sensor 6, and the yaw rate sensor 7 are not particularly limited in the present invention and may be appropriately selected from among the commercially-available ones. The lateral G sensor 5 may be, for example, a piezoelectric-type or strain gauge-type acceleration transducer. The steering angle sensor 6 may be, for example, a rotation angle meter using a potentiometer attached to the vehicle for example.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d to which data is temporarily written or from which the written data is read out when the CPU 2b performs a control operation.

The wheel speed sensor 1 outputs a pulse signal corresponding to the rotation number of a tire (hereinafter also referred to as "wheel speed pulse"). The CPU 2b calculates, based on the wheel speed pulse outputted from the wheel speed sensor 1 and at every predetermined sampling cycle $\Delta T$ (ms) (e.g., $\Delta T = 20$ to 40 ms), the rotational angular velocity Fi that shows the information for the rotation speeds of the respective tires.

The detection system according to the present embodiment is composed of: the wheel speed sensor 1; a rotation speed calculation means for calculating, based on the wheel speed pulse obtained from the wheel speed sensor 1, rotation speeds of the tires; and a determination means for comparing a decreased pressure determination value using the calculated rotation speeds with a predetermined threshold value to determine deflated tires. The determination means determines that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby determining deflated tires.

The detection system according to the present embodiment further includes a calibration means for calculating a correction value to correct the rotation speeds of the respective tires with normal pressure. The calibration means is so configured as to determine that the vehicle is going straight when it is found, with regard to factors composed of a lateral G, a yaw rate, and a steering angle of the vehicle, at least two of the factors including the yaw rate show that a difference between the maximum value and the minimum value at a predetermined time is lower than a predetermined value, thereby performing calibration.

A program according to the present embodiment is installed in the control unit 2 and causes the control unit 2 to function as the rotation speed calculation means, the determination means, and the calibration means.

[Calibration]

Tires attached to a vehicle do not always have an identical size. Furthermore, even tires having an identical size are manufactured to include tolerance within a standard. Thus, the respective tires do not always have an identical rolling radius (a value obtained by dividing the distance traveled by one rotation by $2\pi$) even when all of the tires are at normal pressure, thus resulting in the respective tires having various rotational angular velocities Fi. To solve this, it is required to correct in advance the variation of the rotational angular velocities Fi among the respective tires at a normal pressure for example. This correction is generally called calibration and is carried out based on the following method for example when the vehicle tires are set to have a normal pressure by a periodic maintenance. According to this method, the following initial correction coefficients K1, K2, and K3 are calculated.

$$K1 = F1/F2 \quad (1)$$

$$K2 = F3/F4 \quad (2)$$

$$K3 = (F1 + K1 \times F2)/(F2 + K2 \times F4) \quad (3)$$

During the driving after the calibration, the calculated initial correction coefficients K1, K2, and K3 are used to calculate a new rotational angular velocity $F1_i$ as shown in the formulae (4) to (7).

$$F1_1 = F1 \quad (4)$$

$$F1_2 = K1 \times F2 \quad (5)$$

$$F1_3 = K3 \times F3 \quad (6)$$

$$F1_4 = K2 \times K3 \times F4 \quad (7)$$

In the formulae, the initial correction coefficient K1 is a coefficient to correct the difference in the effective rolling radius due to the initial difference between the front left and right tires. The initial correction coefficient K2 is a coefficient to correct the difference in the effective rolling radius due to the initial difference between the rear left and right tires. The initial correction coefficient K3 is a coefficient to correct the difference in the effective rolling radius due to the initial difference between the front left tire and the rear left tire.

When this calibration is performed during the vehicle cornering, an improper correction coefficient is calculated. Thus, the calibration must be performed when a predetermined going straight is maintained.

In the present embodiment, the calibration as described above is so configured as to determine that the vehicle is going straight when it is found, with regard to factors composed of a lateral G, a yaw rate, and a steering angle of the vehicle measured by the sensors 5, 6 and 7, at least two of the factors including the yaw rate show that a difference between the maximum value and the minimum value at a predetermined time is lower than a predetermined value, thereby performing initialization.

The outputs from the lateral G sensor 5, the steering angle sensor 6, and the yaw rate sensor 7 are given to the control unit 2 at every 20 ms for example. The CPU 2b of the control unit 2 calculates an average value of the measurement values within a period of 1 second for example to sequentially cause the RAM 2d to store the average value. Then, the CPU 2b of the control unit 2 determines that the vehicle is going straight when a difference between the maximum value and the minimum value of the respective measurement values within a period of 30 seconds for example is lower than a "predetermined value".

The "predetermined value" of the lateral G can be, for example, within a range from 0.01 to 0.2 (G) and preferably within a range from 0.03 to 0.09 (G). The "predetermined value" of the yaw rate can be, for example, within a range from 0.5 to 8 (deg/sec) and preferably within a range from 3 to 5 (deg/sec). The "predetermined value" of the steering angle can be, for example, within a range from 0.5 to 15 (deg) and preferably within a range from 5 to 9 (deg).

The predetermined time for the determination can be, for example, 1 to 60 seconds. The unit time for calculating an average value can be 40 ms to 1 second. When an output from the sensor is given at every 20 ms and the unit time is 40 ms, an average value of two outputs is calculated.

In addition to the method of calculating an average value at the predetermined unit time and obtaining a difference between the maximum value and the minimum value by using a plurality of average values within the predetermined time, another method also may be used to calculate a difference between the maximum value and the minimum value based on the respective outputs (pulses) from the lateral G sensor 5, the steering angle sensor 6, and the yaw rate sensor 7.

When it is found, with regard to factors composed of a lateral G, a yaw rate, and a steering angle of the vehicle, at least two of the factors including the yaw rate show that a difference between the maximum value and the minimum value is equal to or higher than a "predetermined value", the calibration means determines that the vehicle is not going straight and thus does not perform the calibration. In the present embodiment, when the determination as described is made, the calculation of the tire rotation speed by the rotation speed calculation means is suspended for a fixed period of time (e.g., about 15 seconds). When it is determined at a predetermined time that the vehicle is not going straight, this cornering may continue, with a high possibility, for a certain period depending on the length of the predetermined time. Thus, even when the determination of the cornering is immediately reset to calculate the average value and a difference between the maximum value and the minimum value immediately, cornering may be determined again with a high possibility. To prevent this, by suspend of the calculation of the tire rotation speed for a fixed period of time, a computer for the detection system installed in the vehicle can use the computational resource effectively.

[Determination of Decreased Pressure]

With regard to the vehicle subjected to the calibration, the rotational angular velocity Fi acquired during driving is corrected based on the formulae (4) to (7) for example. Then, the corrected rotational angular velocity is used to calculate the tire decreased pressure determination value DEL. This decreased pressure determination value DEL is not particularly limited in the present invention and may be conventionally-suggested ones by a conventional method of using the tire rotation speed information to detect deflated tires. For example, the following formula can be used.

$$DEL = \{(F1+F4)/2 - (F2+F3)/2\}/\{(F1+F2+F3+F4)/4\} \times 100(\%)$$

In the formula, F1 to F4 mean the rotational angular velocities of a left front tire (FL), a right front tire (FR), a left rear tire (RL), and a right rear tire (RR), respectively.

Then, the calculated decreased pressure determination value DEL is compared with a predetermined threshold value that is calculated by an experiment running for example in advance and that is stored in the ROM 2c of the control unit 2. When the DEL is higher than the threshold value, deflated tires are determined.

Also in the decreased pressure determination as described above, as in the above-described calibration, the decreased pressure determination must be performed while a predetermined going straight is maintained in order to avoid a false warning or no warning.

In the present embodiment, the detection means for performing the decreased pressure determination as described above is so configured as to determine that the vehicle is going straight when it is found, with regard to factors composed of a lateral G, a yaw rate, and a steering angle of the vehicle measured by the sensor, at least two of the factors including the yaw rate show that a difference between the maximum value and the minimum value at a predetermined time is lower than a predetermined value, thereby determining deflated tires.

The outputs from the lateral G sensor 5, the rudder angle sensor 6, and the yaw rate sensor 7 are given to the control unit 2 at every 20 ms for example. The CPU 2b of the control unit 2 calculates an average value of the measurement values within a period of 1 second for example to sequentially cause the RAM 2d to store this average value. Then, the CPU 2b of the control unit 2 determines that the vehicle is going straight when a difference between the maximum value and the minimum value of the respective measurement values within a period of 30 seconds for example is lower than a "predetermined value".

What has been described in the above paragraphs regarding the "predetermined value" and "predetermined time" for example in relation to the calibration also applies to the decreased pressure determination. The following description will not repeat the above description for simplicity.

Test Example

An FWD (front wheel drive) vehicle was attached with summer 16 inch tires. Then, the vehicle was allowed to drive on a general road to perform going straight and cornering.

The vehicle was equipped with a yaw rate sensor, a lateral G sensor, and a steering angle sensor. The measurement values from these sensors were measured in actual vehicle. The respective sensors output measurement values at every 40 ms to the control unit mounted in the vehicle. In the control unit, there was installed a program for determining that the vehicle is going straight when a difference between the maximum value and the minimum value of the yaw rate value, the lateral G value, and the steering angle value at every 1 second within a period of 30 seconds is lower than a yaw rate value of 4 (deg/sec), a lateral G of 0.07 (G), and a steering angle value of 7 (deg).

Figure 3:
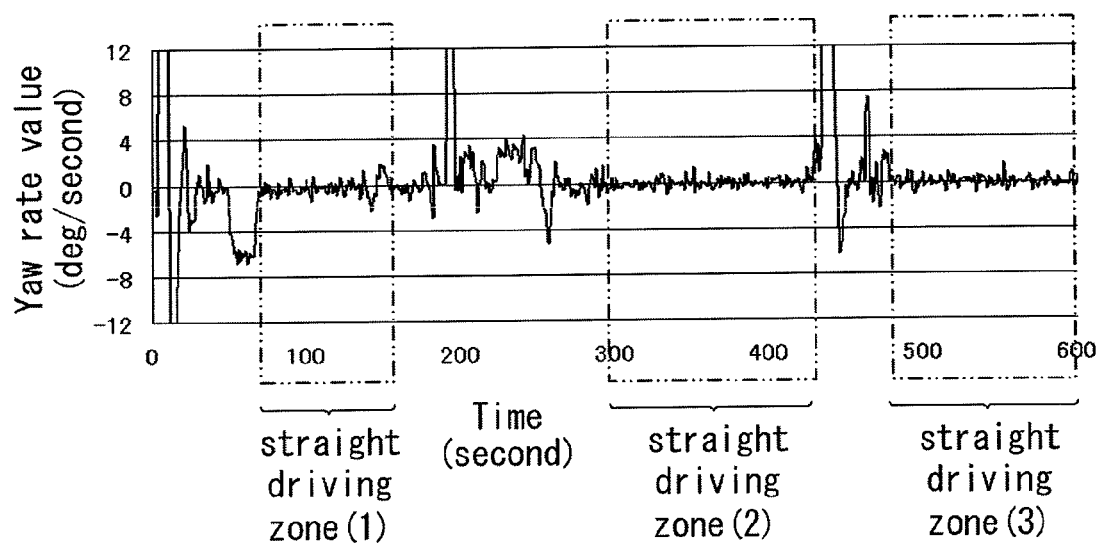
FIG. 3 illustrates a change of the yaw rate value during a test.
Figure 4:
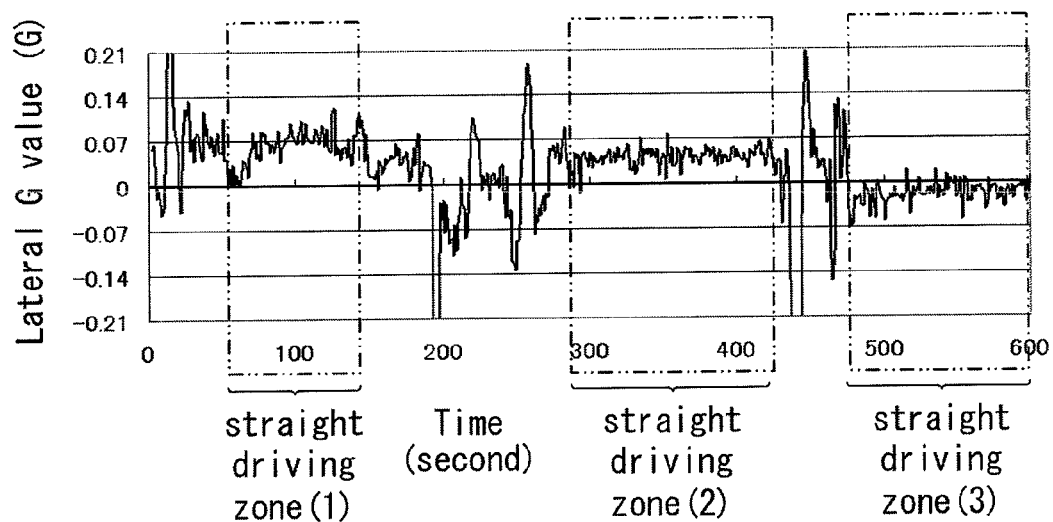
FIG. 4 illustrates a change of the lateral G value during a test.
Figure 5:
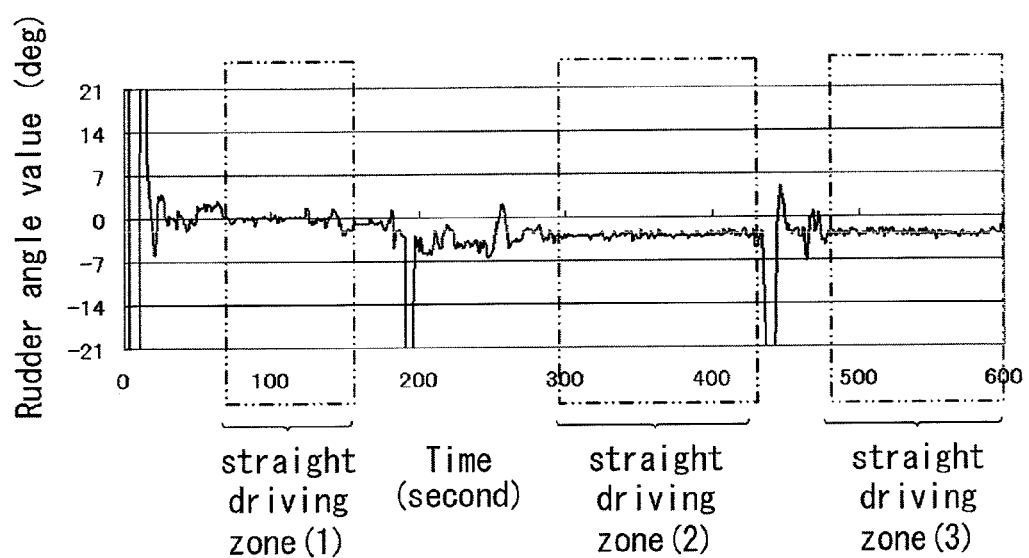
FIG. 5 illustrates a change of the steering angle value during a test.

The result is shown in FIG. 3 to FIG. 5. FIG. 3 to FIG. 5 illustrate a change in the yaw rate value, the lateral G value, and the steering angle value during the test, respectively. In the drawings, the part enclosed by the chain double dashed line shows a part where an actual going straight was performed. The test result shows that it was also correctly determined that the part enclosed by the chain double dashed line is the part where the going straight was performed.

In the present test, it is determined that the vehicle is going straight when all of the yaw rate value, the lateral G value, and the steering angle value are lower than the predetermined value. As can be seen from FIG. 3 to FIG. 5, when the yaw rate value and the lateral G value are lower than the predetermined value and when the yaw rate value and the steering angle value are lower than the predetermined value, it is possible to determine that the part enclosed by the chain double dashed line is the part where the going straight was performed.

REFERENCE SIGNS LIST

1 Wheel speed sensor
2 Control unit
2a Interface
2b CPU
2c ROM
2d RAM
3 Reset button
4 Warning unit
5 Lateral G sensor
6 Steering angle sensor
7 Yaw rate sensor

What is claimed is:

1. A system for detecting deflated tires by making a relative comparison among rotation speeds of tires attached to a vehicle, comprising:
a first sensing device configured to detect rotation speed information of the tires;
a CPU configured to:
calculate, based on the rotation speed information obtained from the rotation speed information detection, rotation speeds of the tires; and
determine deflated tires by comparing a decreased pressure determination value using the calculated rotation speeds with a predetermined threshold value;
a second sensing device configured to continuously measure factors composed of a lateral G, a yaw rate, and a steering angle of the vehicle during a predetermined time period, the predetermined time period including a plurality of predetermined unit time periods, wherein for each factor, a plurality of values, including a maximum value and a minimum value, are obtained, and each of the plurality of values is an average value of measured values measured during each of the plurality of predetermined unit time periods,
wherein the CPU determines that the vehicle is going straight when it is found, with regard to factors composed of the lateral G, the yaw rate, and the steering angle of the vehicle, at least two of the factors including the yaw rate show that a difference between the maximum value and the minimum value over the predetermined time period for respective factor is lower than a predetermined value, thereby determining deflated tires.

2. The system according to claim 1, wherein the CPU is further configured to perform a calibration by calculating, when the CPU determines that the vehicle is going straight, a correction value to correct the rotation speeds of the respective tires when the tires with normal pressure.

3. The system according to claim 1 or claim 2, wherein a predetermined value of the lateral G is a value in the range of 0.03 to 0.09 (G), a predetermined value of the yaw rate is a value in the range of 3 to 5 (deg/sec), and a predetermined value of the steering angle is a value in the range of 5 to 9 (deg).

4. The system according to claim 1 or claim 2, wherein the CPU is configured in such a manner that when the CPU determines that a difference between the maximum value and the minimum value at the predetermined time period is equal to or higher than a predetermined value, the calculation of the tire rotation speed is suspended for a fixed period of time.

5. The system according to claim 2, wherein the CPU is configured in such a manner that the calibration is performed when the CPU determines that a difference between the maximum value and the minimum value at the predetermined time period is equal to or higher than a predetermined value, the calculation of the tire rotation speed is suspended for a fixed period of time.

6. A method of detecting deflated tires by making a relative comparison among rotation speeds of tires attached to a vehicle, including:
   a rotation speed information detection step for detecting rotation speed information of the tires;
   a rotation speed calculation step for calculating, based on the rotation speed information obtained in the rotation speed information detection step, rotation speeds of the tires;
   a determination step for determining deflated tires by comparing a decreased pressure determination value using the calculated rotation speeds with a predetermined threshold value; and
   continuously measuring factors composed of a lateral G, a yaw rate, and a steering angle of the vehicle during a predetermined time period, the predetermined time period including a plurality of predetermined unit time periods, wherein for each factor, a plurality of values, including a maximum value and a minimum value, are obtained, and each of the plurality of values is an average value of measured values measured during each of the plurality of predetermined unit time periods,
   wherein the determination step determines that the vehicle is going straight when it is found, with regard to factors composed of the lateral G, the yaw rate, and the steering angle of the vehicle, at least two of the factors including the yaw rate show that a difference between the maximum value and the minimum value over the predetermined time period for respective factor is lower than a predetermined value, thereby determining deflated tires.

7. The method according to claim 6, further comprising a calibration step for calculating a correction value to correct the rotation speeds of the respective tires when the tires with normal pressure, wherein the calibration step is performed when it is determined that the vehicle is going straight.

8. The method according to claim 6 or claim 7, wherein a predetermined value of the lateral G is a value in the range of 0.03 to 0.09 (G), a predetermined value of the yaw rate is a value in the range of 3 to 5 (deg/sec), and a predetermined value of the steering angle is a value in the range of 5 to 9 (deg).

9. The method according to claim 6 or claim 7, wherein, when the determination step determines that a difference between the maximum value and the minimum value at the predetermined time period is equal to or higher than a predetermined value, the calculation of the tire rotation speed is suspended for a fixed period of time.

10. The method according to claim 7, wherein, when the calibration step determines that a difference between the maximum value and the minimum value at the predetermined time period is equal to or higher than a predetermined value, the calculation of the tire rotation speed is suspended for a fixed period of time.

11. A non-transitory computer-readable storage device having a program for detecting deflated tires embedded thereon for, when executed on a computer, causing, in order to detect deflated tires by making a relative comparison among rotation speeds of tires attached to a vehicle, the computer to perform the following steps of:
   detecting rotation speed information of the tires;
   calculating rotation speeds of the tires based on the detected rotation speed information;
   determining deflated tires by comparing a decreased pressure determination value using the calculated rotation speeds with a predetermined threshold value; and
   continuously measuring factors composed of a lateral G, a yaw rate, and a steering angle of the vehicle during a predetermined time period, the predetermined time period including a plurality of predetermined unit time periods, wherein for each factor, a plurality of values, including a maximum value and a minimum value, are obtained, and each of the plurality of values is an average value of measured values measured during each of the plurality of predetermined unit time periods,
   wherein the step of determining further determines that the vehicle is going straight when it is found, with regard to factors composed of the lateral G, the yaw rate, and the steering angle of the vehicle, at least two of the factors including the yaw rate show that a difference between the maximum value and the minimum value over the predetermined time period for respective factor is lower than a predetermined value, thereby detecting deflated tires.

12. The non-transitory computer-readable storage device according to claim 11, wherein the computer is further caused to perform a calibration step by calculating a correction value to correct the rotation speeds of the respective tires with normal pressure, when the step of determining determines that the vehicle is going straight.

13. The non-transitory computer-readable storage device according to claim 11 or claim 12, wherein a predetermined value of the lateral G is a value in the range of 0.03 to 0.09 (G), a predetermined value of the yaw rate is a value in the range of 3 to 5 (deg/sec), and a predetermined value of the steering angle is a value in the range of 5 to 9 (deg).

14. The non-transitory computer-readable storage device according to claim 11 or claim 12, wherein, when the step of determining determines that a difference between the maximum value and the minimum value at the predetermined time period is equal to or higher than a predetermined value, the calculation of the tire rotation speed is suspended for a fixed period of time.

15. The non-transitory computer-readable storage device according to claim 12, wherein, when the calibration step determines that a difference between the maximum value and the minimum value at the predetermined time period is equal to or higher than a predetermined value, the calculation of the tire rotation speed is suspended for a fixed period of time.

* * * * *